United States Patent [19]

Arbel

[11] Patent Number: 4,879,745
[45] Date of Patent: Nov. 7, 1989

[54] HALF-DUPLEX SPEAKERPHONE

[75] Inventor: Ygal Arbel, Sunnyvale, Calif.

[73] Assignee: IBM Corporation, San Jose, Calif.

[21] Appl. No.: 253,610

[22] Filed: Oct. 12, 1988

[51] Int. Cl.$^4$ ............................................. H04M 1/60
[52] U.S. Cl. ..................................... 379/389; 379/390
[58] Field of Search ............... 379/389, 390, 388, 409, 379/420

[56] References Cited

U.S. PATENT DOCUMENTS

| | | | |
|---|---|---|---|
| 3,751,602 | 8/1973 | Breeden. | |
| 4,629,829 | 12/1986 | Puhl et al. | 379/358 |
| 4,636,586 | 1/1987 | Schiff | 379/390 |
| 4,649,505 | 3/1987 | Zinser, Jr. et al. | 379/411 |
| 4,741,018 | 4/1988 | Potratz et al. | 379/58 |
| 4,752,903 | 6/1988 | Iwata et al. | 379/411 |
| 4,757,527 | 7/1988 | Beniston et al. | 379/410 |
| 4,796,287 | 1/1989 | Reesor et al. | 379/390 |

OTHER PUBLICATIONS

"A/D and D/A Conversion System for A-Law Pulse Code Modulation" by A. Pele IBM Technical Disclosure Bulletin, vol. 18, No. 8, Jan. 1976, pp. 2686-2688.
"Delta Modulation Coding With Nonuniform Adaptive Companding" by R. J. Hallett, et al., IBM Technical Disclosure Bulletin, vol. 22, No. 1, Jun. 1979, pp. 217-219.
"Voice Response for Data Processing Equipment" by G. L. Crauwels et al., IBM Technical Disclosure Bulletin, vol. 24, No. 11B, Apr. 1982, pp. 5890-5895.
"Overflow Control in Voice Coder" by C. Galand et al., IBM Technical Disclosure Bulletin, vol. 26, No. 10A, Mar. 1984, p. 5300.
"Full Duplex Speakerphone" by M. A. Einkauf et al., IBM Technical Disclosure Bulletin, vol. 29, No. 12, May 1987, pp. 5599-5602.
"Digital Speakerphones: Is Full-Duplex Possible" by Gary Kloesz, Business Communications, Jul. 13, 1987, pp. 36 & 40.

*Primary Examiner*—James L. Dwyer
*Attorney, Agent, or Firm*—Perman & Green

[57] ABSTRACT

A half-duplex digital speakerphone includes a control state machine which controls the selection of either a transmit or a receive audio path based upon a present state of the speakerphone and the magnitudes of three signal related variables associated with each path. The three variables for each path includes a signal power variable, a noise power variable and a worst-case echo variable. A change of state of the state machine results in the value of a variable gain within each of the paths being adjusted to optimize the transition time from the receive to the transmit state or from the transmit to the receive state. Also optimized is a change of state from an idle state to a transmit or receive state or from a transmit or receive state to the idle state. A change of state is accomplished in accordance with a smoothly varying, substantially Gaussian switching waveform which is selected to optimize the transition time between states while simultaneously minimizing audible side effects.

25 Claims, 5 Drawing Sheets

HALF-DUPLEX SPEAKERPHONE

FIELD OF THE INVENTION

This invention relates generally to telephony apparatus and, in particular, relates to a half-duplex speakerphone which includes a state machine for selecting either a transmit or a receive signal path, the state machine being responsive to the values of a set of three signal related variables for each of the signal paths.

BACKGROUND OF THE INVENTION

A speakerphone generally includes a microphone coupled to an input of a transmit signal channel and a speaker coupled to an output of a receive signal channel. A speakerphone permits "hands-free" operation of a telephone set. In a half-duplex speakerphone only one of the signal channels is active, the other channel being disabled by having a significant amount of signal loss inserted therein. In general, circuitry must determine which channel is conveying speech signals so as to disable the other channel. This determination is preferably accomplished in a rapid manner so as not to clip or otherwise attenuate the initial portion of the speech signal. This determination must also accommodate a verbal interruption of the speaking party by the silent party so as to rapidly switch between the receive and the transmit signal channels or between the transmit and the receive signal channels.

Complicating this determination are the presence of circuit and trunk noise signals and also the presence of echo signals. Echo signals may result from inadvertent acoustic coupling from the speaker to the microphone. Echo signals may also result from impedance mismatches within the audio coupling devices which connect the transmit and receive channels to the line. The echo component due to acoustic coupling between speaker and microphone may be especially difficult to control in that the degree of coupling is often influenced by such factors as the acoustic characteristics of the room, the relative position of the speaker to the microphone, or even the position of the user's body relative to the speakerphone. In that the magnitude of the echo signal component may exceed the value of the voice signal, a significant variability of speakerphone performance may be experienced.

It is therefore one object of the invention to provide a half-duplex speakerphone which switches rapidly between speech signal paths.

It is another object of the invention to provide a half-duplex speakerphone which readily provides for improved interruptability.

It is still another object of the invention to provide a half-duplex speakerphone which provides a significant immunity to the effects of circuit and trunk noise and also echo signals.

SUMMARY OF THE INVENTION

The foregoing and other problems are overcome and the objects of the invention are realized by a half-duplex digital speakerphone which, in accordance with the methods and apparatus of the invention, includes a control state machine which controls the selection of either a transmit or a receive audio path based upon at least a present state of the speakerphone and the magnitudes of three signal related variables associated with each path. The three variables for each path includes a signal power variable, a noise power variable and a worst-case echo variable. A change of state of the state machine results in the value of a variable gain within each of the paths being adjusted to optimize the transition time from the receive to the transmit state or from the transmit to the receive state. Also optimized is a change of state from an idle state to the transmit or receive state or from the transmit or receive state to the idle state. A change of state is accomplished in accordance with a smoothly varying, substantially Gaussian switching waveform which is selected to optimize the transition time between states while simultaneously minimizing audible side effects.

In one embodiment of the invention the state machine is a software implemented state machine which is generated and maintained by a digital signal processor integrated circuit device. The implementation of either Mu-Law or A-Law signal processing is readily accommodated by the provision of appropriate software. The control state machine determines the next state of the speakerphone based on the current state and also on the value of four signal and noise related variables of a binary nature. A change of state is accomplished in accordance with a switching waveform which is selected to optimize the transition time between states while simultaneously minimizing audible side effects.

BRIEF DESCRIPTION OF THE DRAWINGS

These and other aspects of the invention will be made more apparent in the following Detailed Description of the Invention read in conjunction with the accompanying Drawing, wherein.

DETAILED DESCRIPTION OF THE INVENTION

Figure 1:
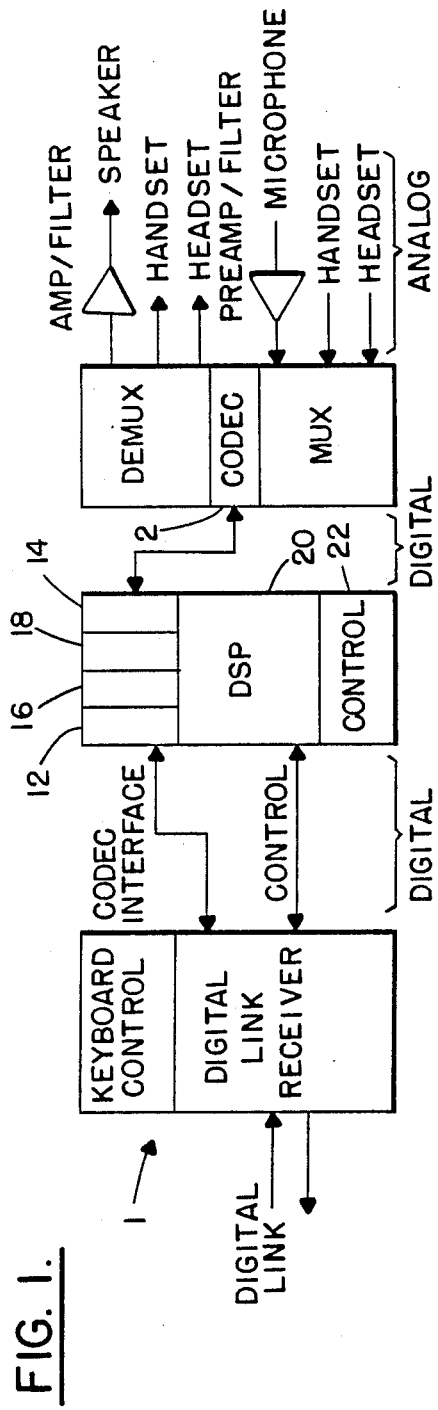
FIG. 1 is a block diagram of a half duplex speaker phone.
Figure 4E:
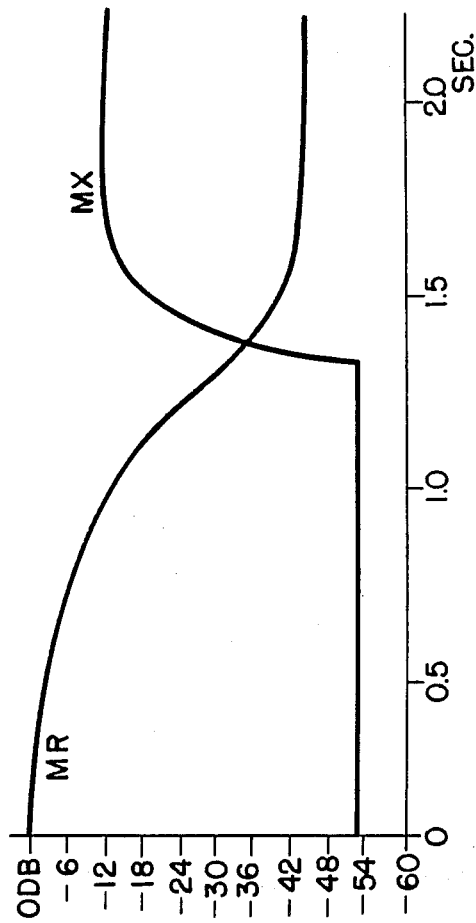
FIGS. 4(a)–4(e) are graphical depictions of the MX and MR waveforms during various state change operations.

Referring now to FIG. 1 there is shown a block diagram of a Half-Duplex Digital Speakerphone 10 which will be referred to herein as a HADSI. The HADSI 10 is a component of a speakerphone device and is interconnected between a digital link transceiver and a CODEC. The HADSI 10 includes voice channel interface 12 on the link side, a voice channel interface 14 on the CODEC side, Mu/A-Law to linear and linear to Mu/A-Law convertors 16 and 18, a digital signal processor (DSP) 20 which includes voice switching, filtering and half duplex control, and general control and timing circuits 22.

The following is a general description of data flow through the HADSI 10. In the downlink direction, voice information is demultiplexed from the link by the digital link transceiver and is coupled to the HADSI 10 through a serial communications port. The voice data is in the format of 8-bit bytes, encoded using one of two approximately logarithmic scales known in the art as either Mu-Law or A-Law. Inasmuch as the calculations performed by DSP 20 require the signals to be in a linear scale, a log-to-linear conversion of the incoming signal is performed. Within the DSP 20 the signal is filtered and attenuated, if necessary, according to the switching algorithm which will be described in detail below. The signal is thereafter converted back to the appropriate logarithmic scale and input to the CODEC for conversion into an analog signal. This analog signal is thereafter input to a loudspeaker. The uplink path is similar to that described above but in a generally reversed order.

If the speakerphone is in a handset or a headset mode of operation the HADSI 10 operates in a passive manner, in which it functions as a transparent connection between the CODEC 2 and the link transceiver 1.

The various possible states which the HADSI 10 may enter are as follows. In an OFF state the speakerphone is placed in a power-down condition during a phone idle state. In a PASSIVE state, the HADSI operates in a transparent mode during phone handset and headset operation. An ACTIVE state includes one of three possible states. These are a TRANSMIT state wherein a user, or near-end talker, channel is enabled, a RECEIVE state wherein a far-end talker channel is enabled, and an IDLE state which is entered when both the near-end and the far-end parties are silent.

In the ensuing description the HADSI 10 may be considered as an intelligent switch wherein a control state machine enables either the transmit or receive audio paths based upon estimates of three variables for each path. These variables are signal power, noise power and worst-case echo. This is accomplished by determining which party is talking and switching the transmission direction accordingly, while allowing for the silent party to interrupt the talking party. In addition, the HADSI 10 has an ability to adapt to background noise and to distinguish between noise and speech.

Figure 2:
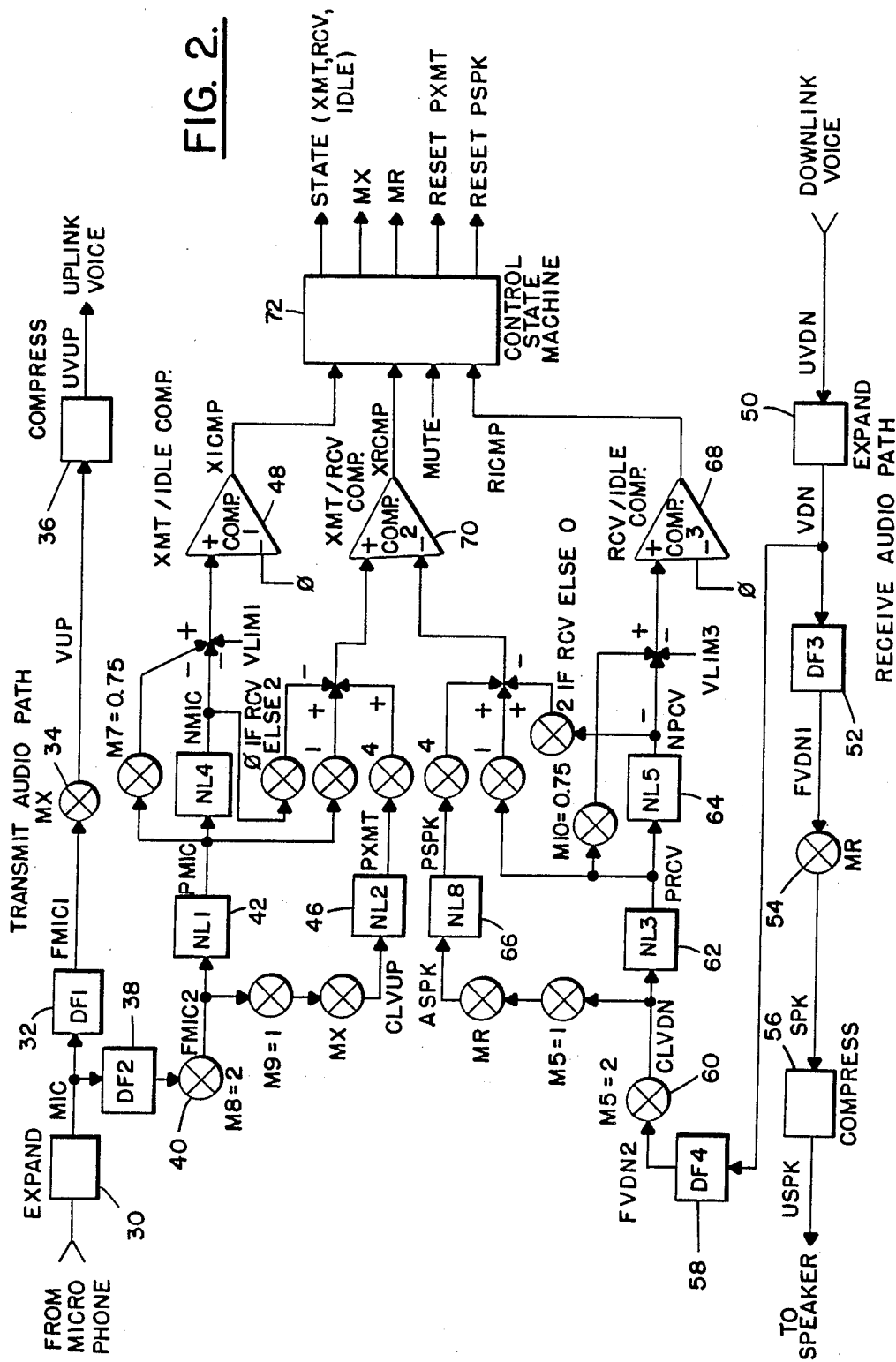
FIG. 2 is a detailed block diagram of a portion of the half duplex speakerphone of FIG. 1.

FIG. 2 is a detailed block diagram of the HADSI 10. In general, the basic structure is symmetrical for the transmit, or uplink, and the receive, or downlink, signal paths. The transmit path will be described in detail first.

The MU-Law/A-Law microphone input signal UMIC is input to an expander 30 where the UMIC signal is expanded into a linear 16-bit 2's complement signal MIC. MIC is filtered as necessary by audio path filter DF1 32. The filtered signal FMIC1 is input to a multiplier 34 where FMIC1 is multiplied by a variable gain designated MX MX varies between 1 (0 dB) and 0.0022 (−53 dB) according to the selected active direction. The resulting signal is designated as VUP which is provided to a signal compressor 36 where VUP is compressed back into a MU-Law or an A-Law representation designated as UVUP. UVUP is coupled uplink.

The input signal MIC is also high-pass filtered by a control path filter DF2 38 and is amplified by amplifier 40 by a factor designated as M8. M8 may equal an amplification factor of two. If an overflow occurs during multiplication the output signal FMIC2 is clipped. Next, a signal power estimate signal PMIC is generated in a non-linear block NL1 42. A noise power estimate signal NMIC is generated in non-linear block NL4 44. A worst case echo estimate signal PXMT is generated by non-linear block NL2 46, based on the current value of the variable gain MX. A comparator 48 provides a comparison between signal and noise power and produces a binary variable XICMP which indicates either the presence or the absence of a speech signal at the microphone input.

As was previously stated, the receive channel is generally symmetric with the transmit channel. A MU-Law/A-Law input signal UVDN is input to an expander 50 wherein the UVDN signal is expanded into a linear 16-bit 2's complement signal VDN. VDN is filtered as necessary by audio path filter DF3 52. The filtered signal FVDN1 is input to a multiplier 54 where FVDN1 is multiplied a variable gain MR. The resulting signal is designated as SPK which is provided to a signal compressor 56 where SPK is compressed back into a MU-Law or an A-Law representation designated as USPK. USPK is coupled to and drives a loudspeaker (not shown).

The filtered input signal VDN is also high-pass filtered by a control path filter DF4 58 and is amplified by amplifier 60 by a factor designated as M6. M6 may equal an amplification factor of two. If an overflow occurs during multiplication the output signal CLVDN is clipped. Next, a receive signal power estimate signal PRCV is generated in a non-linear block NL3 62. A noise power estimate signal NRCV is generated in non-linear block NL5 64. A worst case echo estimate signal PSPK is generated by non-linear block NL8 66, based on the current value of the variable gain MR. A comparator 68 provides a comparison between signal and noise power estimates and produces a binary variable RICMP which indicates either the presence or the absence of a speech signal at the downlink input.

A weighted sum of the receive speech signal, the noise signal and the worst case echo estimate signal is compared by a comparator 70 against a similar sum for the transmit channel, producing a transmit/receive variable XRCMP.

A control state machine 72 determines the next state of the phone based on the current state and also the value of four variables of a binary nature. These four variables are the XICMP, RICMP and XRCMP signals in addition to a software generated MUTE signal.

As will be described, whenever a state change occurs the values of MX and MR are modified according to a switching waveform designed to optimize transition time between states while minimizing audible side effects.

The various blocks of FIG. 2 will now be described in greater detail. The Mu-Law/A-Law expansion and compression which occurs in expanders 30 and 50 and in compressors 36 and 56 is based on a known algorithm wherein the logarithmic curve is approximated by a set of eight straight-line segments.

The audio path filters DF1 32 and DF3 52 are each optional and may be employed to achieve any required frequency shaping of the input signals. For example, DF3 52 may be employed to pre-compensate for the loudspeaker's inherent non-flat response at low frequencies. DF3 52 is preferably implemented as a fifth order finite impulse response (FIR) linear phase filter rather than as an infinite impulse response (IIR) filter in order to avoid limit cycle oscillations in the audio path.

High-pass filters DF2 38 and DF4 58 are selected to minimize effects of low-frequency power supply noise such as 60 Hz hum and harmonics and, in the transmit path, to reduce the effect of room echo and reverberations. These filters are also selected to provide an improved signal to noise (SNR) ratio in that most speech energy is typically above 500 Hz. By example, the corner frequency of DF2 38 is approximately 660 Hz and the corner frequency of DF4 58 is approximately 725 Hz. A higher corner frequency in the receive path has been found to achieve enhanced protection against power supply and trunk noise.

Filters DF2 38 and DF4 58 are each implemented as first order IIR filters in that, with a digital signal processor, an implementation of an IIR filter generally requires less instruction execution time and also fewer coefficient terms and taps than an equivalent FIR filter. The inherent limit cycle oscillations and phase distortion of IIR filters are irrelevant in the control path in that it is the audio signal envelope which is processed and not an AC audio signal.

One purpose of the control path gain provided by M8 40 and M6 60 is to improve the resolution for low-level signals, thereby improving the accuracy of the noise power estimates and the IDLE state stability. It should be noted that as a result of the gain of both M8 40 and M6 60 being larger than one, full-scale signals are clipped, causing a saturation effect. However, it has been found that for a gain of M8=M6=2 clipping does not significantly degrade the performance of the HADSI 10 when processing large amplitude signals, whereas the increased resolution of small amplitude signals significantly improves performance.

The signal power estimator blocks NL1 42 and NL3 62 function as envelope detectors. Their outputs PMIC and PRCV, respectively, are non-negative signals which are linearly proportional to the input signal's short-time average amplitude. The non-linear calculation performed by each of these blocks may be described as:

Examine only the negative portion of the input Vin;

Examine only the negative portion of the input $V$in;

If $[-V\text{in}(n)] > V\text{out}(n - 1)$ then
$\quad V\text{out}(n) = [-V\text{in}(n)] - ([-V\text{in}(n)] - V\text{out}(n - 1))*TR$
Else $\quad V\text{out}(n) = V\text{out}(n - 1)*TF,$ where TR is a rise-time constant and TF is a fall-time constant and TR is less than TF. The symbol * denotes multiplication. It should be noted that this is a recursive operation which represents exponentially rising and falling waveforms. Thus, either a rising or a falling waveform is equivalent to an IIR low-pass filter.

The value of TR determines how quickly the output rises and how closely the output approaches the peaks of the input signal. Hence the rise-time is preferably of a short duration, but not of such a short duration as to degrade the averaging effect. If TR is made of insufficient duration the circuit may be sensitive to noise and short duration spikes. A rise-time of approximately one millisecond has been found to provide satisfactory operation. For an eight KHz signal sampling rate one millisecond corresponds to eight samples. By definition, the time constant is the time it takes for a signal to decay to EXP$[-1]$ of its initial value.

The value of TF determines how quickly the output decays to zero when the input signal is zero and also how closely the estimated signal will correspond to the signal peaks between peaks. Thus, TF should be of sufficiently long duration but not so long that the output cannot track the envelope of a rapidly varying signal. Furthermore, if TF is too long in duration an error will be introduced at the end of a speech segment in that the estimated signal will introduce an inappropriate delay. It has been found that a TF of approximately 28 milliseconds provides for satisfactory operation.

The input to the non-linear noise power estimator blocks NL4 44 and NL5 64 is the corresponding signal power estimate PMIC and PRCV, respectively. When no speech is present, the signal power estimate represents the average envelope of any constant background noise.

Since speech typically includes pauses between words and also some silent intervals, the minima points of the signal power estimate represent the background noise. Therefore the noise tracks the minima points of the signal power. The non-linear calculation performed by each of these blocks may be described as:

If $V\text{in}(n) < V\text{out}(n - 1)$ then
$\quad V\text{out}(n) = V\text{in}(n)$
Else $\quad V\text{out}(n) = V\text{out}(n - 1) + INCR.$ It can be seen that the output immediately follows the input if a new minimum value is detected otherwise the output rises linearly at a slow rate. The value of INCR is such that an adjustment to typical noise levels requires approximately one second while an adjustment to noise which is 20 dB below the full-scale signal value requires approximately 10 seconds. The actual value of INCR is a function of desired convergence time versus the desired accuracy or the amount of ripple which is acceptable. Preferably INCR will have a value such that normal speech levels do not cause the noise estimate to ramp-up excessively, thus producing inaccuracy and ripple, while simultaneously providing a short convergence time to the actual noise level.

When speech is transmitted, echo is generated. In the receive path echo is primarily due to acoustic coupling from the speaker to the microphone while in the transmit path echo is generated due to an inherent impedance mismatch at the 4-wire/2-wire analog coupler. Inasmuch as the echo appears as a legitimate speech signal and in some cases its amplitude is larger than the original speech signal, the echo signal may cause switching and even an oscillation between the transmit and the receive states. In order to avoid this problem, once transmission in one direction has started, the invention defines a time-amplitude window which contains the worst-case echo waveform for the given transmitted waveform.

The transmit path worst-case echo block NL2 46 operates in accordance with the following criterion:
While in XMT state:

For any waveform $VUP(n)$,
and for any "Reasonable" echo function
$PXMT(n) > PRCV(n)$ for all $n$.

It should be remembered that PXMT and PRCV are envelope, or power estimate waveforms, and not AC speech signals.

It has been found that typical worst-case echo parameters are as follows: the shortest echo delay time is approximately two milliseconds and the worst-case echo gain is approximately +10 dB. It is assumed that any loss in the echo path is a resistive, or linear, loss such that the echo gain falls off at 6 dB/octave. The linear echo gain function G is therefore:

$G = 6.2/t$ where t is greater than two milliseconds. Thus, a two millisecond echo has a gain of 3.1 (10 dB), while a 4 millisecond echo has a gain of 1.55 (3.8 dB).

The worst-case echo estimate blocks NL2 46 and NL8 66 are each envelope detectors and are substantially identical in operation to the aforedescribed signal power estimate blocks NL1 42 and NL3 62 except that they operate with a faster rise-time and a slower fall-time. A shorter rise-time increases the output signal level and enhances protection against the leading edge of the echo. The rise-time may be made as short as desired. For example, the rise-time may be on the order of 0.25 millisecond which implies that, if the input signal is limited to a four KHz bandwidth, that the input signal may be tracked in real-time. The fall-time is preferably of a relatively long duration to protect against the worst case echo or the sum of multiple echoes. However, setting the fall-time at too great a value hinders "ping-pong" switching operations and also degrades interruptability. It has been determined that a fall-time of approximately 100 milliseconds provides for suitable performance.

It should be noted that the input of NL2 46 and NL8 88 is scaled by MX and MR, respectively, thereby enabling the generation of a corresponding echo estimate only when an echo estimate is relevant for proper operation. That is, the echo estimate is enabled for the transmit and idle but not receive condition or for the receive and idle but not transmit condition. In addition, it should be noted that PXMT and PSPK, the outputs of NL2 46 and NL8 66, respectively, are reset to zero when a state change to receive or transmit occurs.

A major function of the transmit/idle comparator 48 and the receive/idle comparator 68 is to detect when speech is not present at the associated signal path input. This is achieved by comparing relative values of signal power and noise power, as indicated below for the transmit path. The receive path comparison is similar.

Evaluate: $V_{in} = M7*PMIC - NMIC - VLIM1$
If $V_{in} > 0$ then  $XICMP = 1$ (indicates transmit)
Else  $XICMP = 0$ (indicates idle).

The two parameters, M7 and VLIM1 define the comparator's behavior. If VLIM1 is zero, then M7 defines a fixed SNR required to acknowledge the signal as speech. If VLIM1 is positive, the required SNR decreases as the noise level increases. This can be seen by solving the preceding expression for Vin=0 and rearranging, $$SNR = \frac{PMIC}{NMIC} = \frac{1 = VLIM1/NMIC}{M7}.$$

This is a desirable characteristic in that a phone user typically does not maintain a fixed speech-to-noise ratio as background noise increases.

The appropriate values for M7 and VLIM1 are chosen with a consideration for the desired amount of stability versus the desired response to low-level, non-noise signals. It has been found that M7=0.75 and VLIM1=100 achieves a satisfactory result. The value represented by 100 is a 16 bit fractional representation, equivalent to 100/32768 or 0.00305.

The transmit/receive comparator 70 selects between the transmit and the receive states based upon the current state and the signal power, noise and echo estimates. Under an ideal condition wherein there is no noise and no echo it would be sufficient to merely compare the transmit and the receive signal power estimates. However, in that actual operating conditions always contain some degree of noise and echo a more sophisticated technique is desirable. In accordance with the invention echo is compensated for by biasing the comparison by adding the echo estimate of the active path to the signal power estimate of the active path. In addition, noise is compensated for by subtracting from the signal power estimate a scaled version of the noise estimate. This technique is expressed by:

(a) During the XMT or the IDLE state:

Evaluate $V_{in} = $
$4*PXMT + PMIC - 2\ NMIC - (4*PSPK + PRCV)$
if $V_{in} > NL7TH$ then  $XRCMP = 1$ (indicates transmit)
if $V_{in} < -NL7TH$ then  $XRCMP = -1$ (indicates receive)
Else  $XRCMP = 0$, and (b) During the RCV state:

Evaluate $V_{in} = $
$4*PXMT + PMIC - (4*PSPK + PRCV - 2*NRCV)$
if $V_{in} > NL7TH$ then  $XRCMP = 1$ (indicates transmit)
if $V_{in} < -NL7TH$ then  $XRCMP = -1$ (indicates receive)
Else  $XRCMP = 0$.

NL7TH represents, in the preceding expressions, a hysteresis width parameter. It defines an intermediate state (XRCMP=0) in which the difference between the transmit and the receive signals is not significant. The terms (4*PXMT) and (4*PSPK) represent the worst case echo plus some predetermined stability margin. Subtracting two noise estimates from the active path signal compensates for the fact that both the signal and the echo estimates include the noise component. The actual value of the comparator 70 output XRCMP is useful only during active speech. When both XICMP and RICMP indicate an idle state, the state machine 72 sets the state to IDLE regardless of the value of XRCMP, as will be described in detail below.

Figure 3:
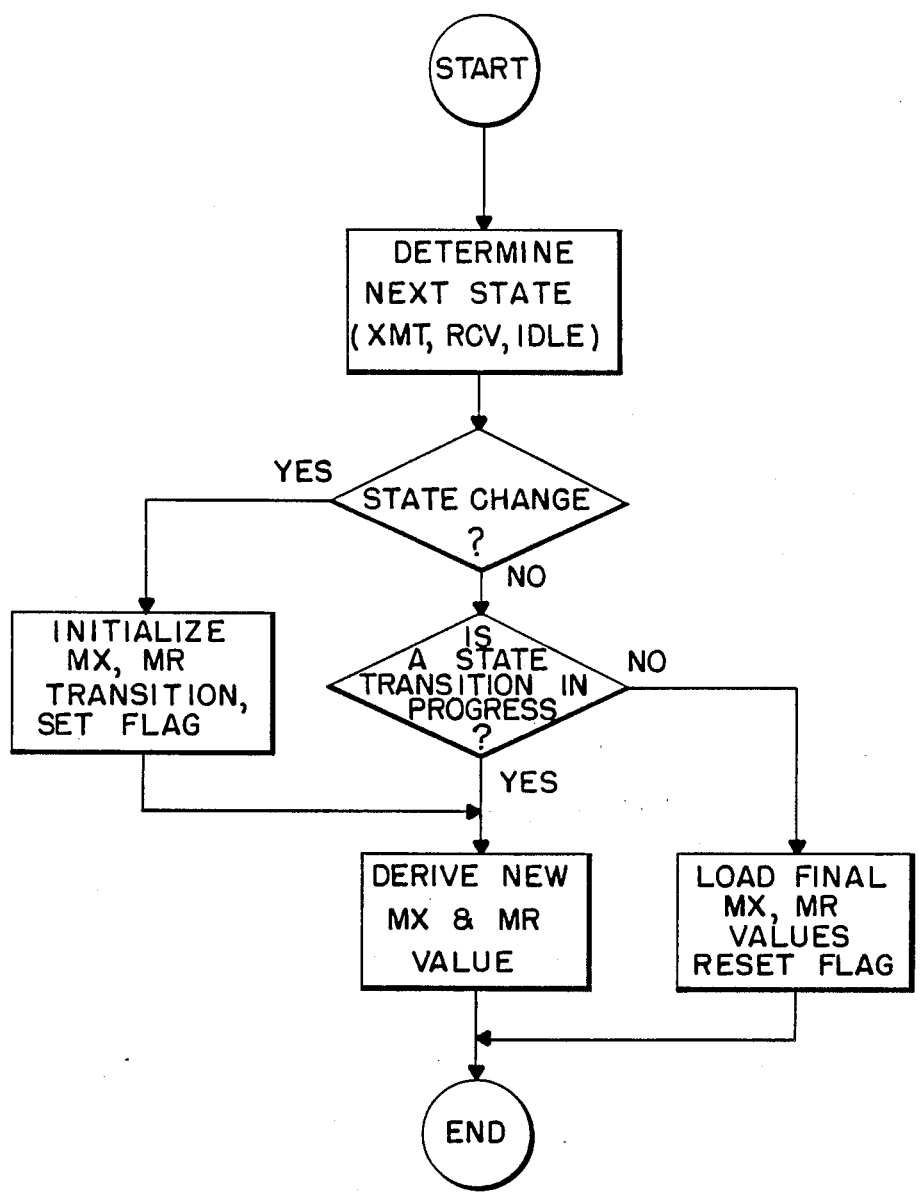
FIG. 3 is a simplified flow chart which illustrates the operation of the control state machine 72 of FIG. 2.
Figure 4A:
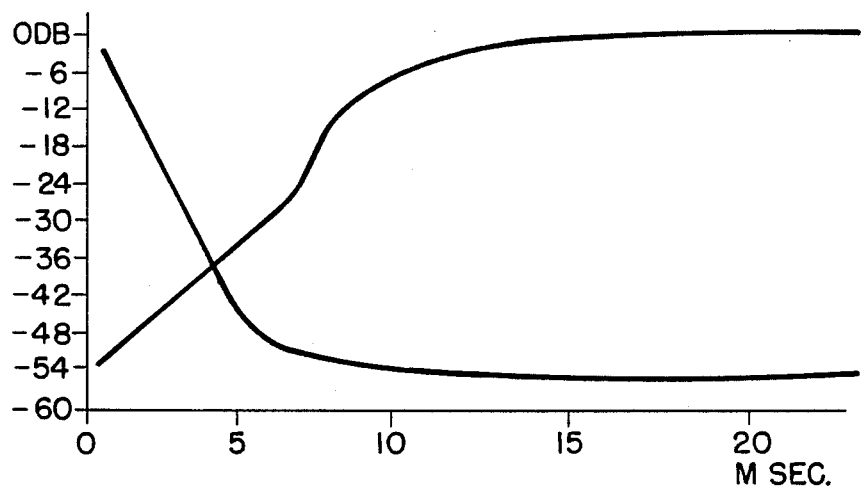
Figure 4B:
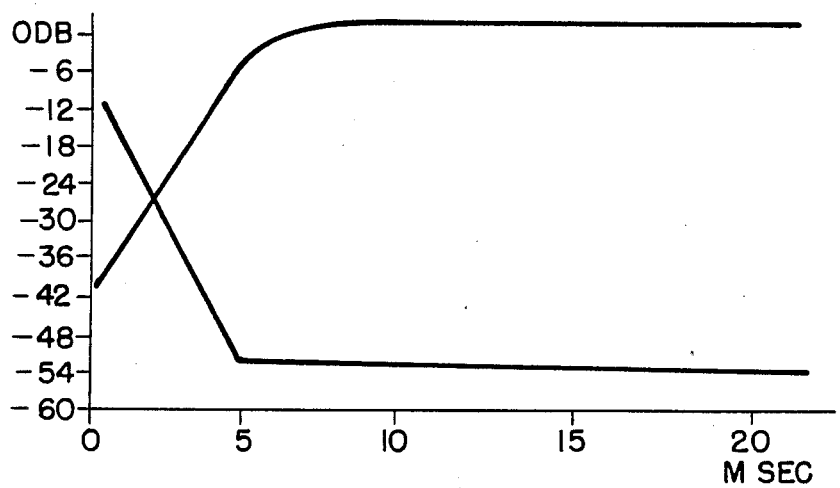
Figure 4C:
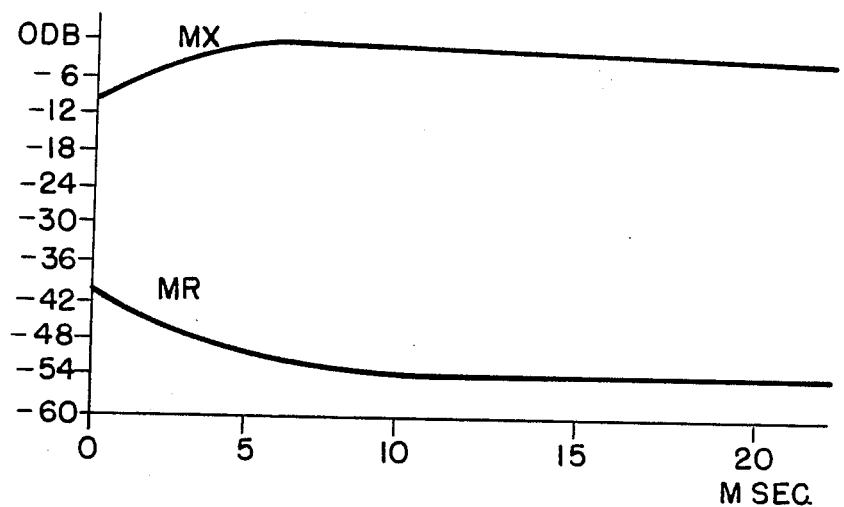
Figure 4D:
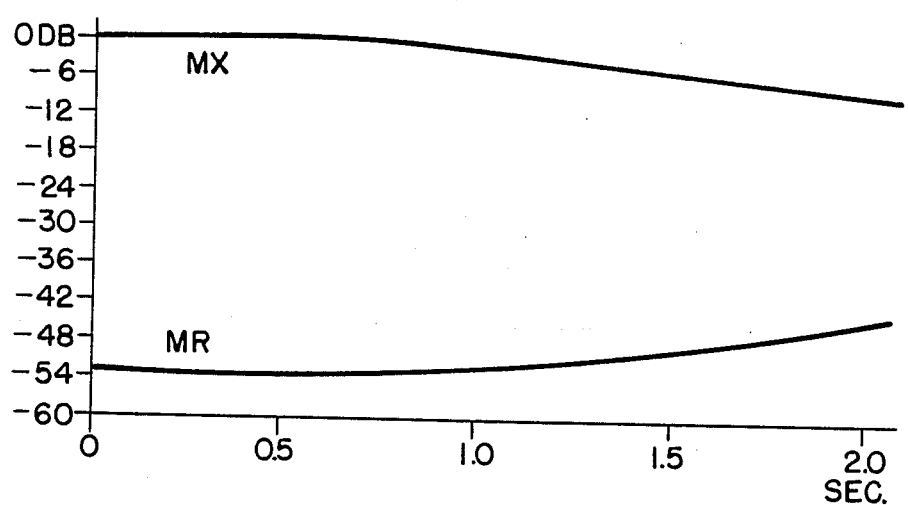

The control state machine (CSM) 72 determines the phone's next state and also executes audio channel switching by calculating MX and MR according to predetermined switching waveforms. In addition, the CSM 72 modifies circuit variables as necessary. The basic operation of the CSM 72 is shown in the flow chart of FIG. 3. Inasmuch as the control path parameters change relative slowly, CSM 72 calculations need not be done for each eight KHz sample. CSM 72 calculations may instead need to be performed only every fourth sample, i.e. at a rate of two KHz.

The phone's next state is determined according to the following procedure:

If MUTE=1 then NEXT STATE=RCV.

If MUTE=0 then NEXT STATE is determined according to the following transition table,

| PRESENT STATE (PS) | | | |
|---|---|---|---|
| XICMP | RICMP | XRCMP | NEXT STATE |
| 0 | 0 | 1,0, −1 | IDLE |
| 1 | 0 | 1,0, −1 | XMT, PS, PS |
| 0 | 1 | 1,0, −1 | PS, PS, RCV |
| 1 | 1 | 1,0, −1 | XMT, PS, RCV |

PS indicates that the present state is maintained. Each of these table entries will now be considered in greater detail.

XICMP=0 and RICMP=0 - This condition indicates that no speech is present at either input. Therefore the next state is IDLE regardless of the state of XRCMP.

XICMP=1 and RICMP=0 - This condition indicates that speech is present in the transmit direction only. This has been found to be a relatively rare situation in that normally echo appears at the other side unless the call is an internal call (no analog coupler echo); or the condition occurs in a delay period before the echo is received; or the condition is a transient or temporary phenomenon. If XRCOM=1 then the next state is XMT, since all three variables are in agreement. If XRCMP=−1 this condition contradicts the XICMP and RICMP values. Therefore, this condition is considered to be a transient condition and the present state remains unchanged. XRCMP=0 indicates the hysteresis region between the transmit and the receive states and, as a result, the present state remains unchanged.

XICMP=0 RICMP=1 - This condition indicates that speech is present in the receive direction only and parallels the condition described immediately above. XICMP=1 RICMP 1. This is the most common operational condition and indicates that speech is present, due to echoes, in both signal paths. For this condition the XMT state is selected if XRCMP=1 and the RCV state is selected if XRCMP=−1. XRCMP=0 indicates the aforementioned hysteresis region which is a function of the value of the NL7TH constant at the comparator 70. For this condition either the PS or IDLE states may be chosen. The choice is not critical in that transition into the IDLE state is relatively slow and for the first several hundred milliseconds the present state (PS) is effectively maintained. However, it has been found that remaining in the PS is preferred in that the stability of the XMT and RCV states is improved.

As has been previously stated, MX and MR are the audio channel variable gain functions. Half-duplex speakerphone operation implies that only one channel of transmission may be active when speech is transmitted.

It is not necessary, however, to completely disconnect the other direction so long as "singing" and oscillations due to positive loop gain are avoided. Therefore it is sufficient to maintain a negative loop gain by controlling MX and MR. A worst case analysis indicates that the minimum required loss in the loop is 50 dB. Preferably, a loss of 53 dB provides a safety margin. The following table sets forth the gain values of MX and MR employed in the various steady states.

| STATE | MX | MR |
|---|---|---|
| XMT | 0 dB | −53 dB |
| RCV | −53 dB | 0 dB |
| IDLE | −10 dB | −43 dB |

When a state change occurs MX and MR are switched by CSM 72. In that instantaneous switching causes an audible noise the gains are preferably switched gradually and in accordance with the following criteria. Switching must occur fast enough to minimize first syllable clipping, switching must not produce audible side-effects and, during switching, negative loop gain must be maintained. It has been found that switching which occurs within 20 milliseconds is suitable to avoid first syllable clipping while also avoiding audible side effects.

In accordance with one aspect of the invention it has been determined that the optimum switching waveform resembles a bell-shaped or Gaussian function. An important factor is the rate of change, or first derivative of the function, which is preferably continuous at the transition edges. In other words, the switching waveform preferably starts and ends smoothly and is free of abrupt transitions. This optimum shape of the switching waveform applies to the logarithm of the curve and is related to the logarithmic response of the human ear with respect to signal amplitude.

The MX and MR switching waveforms generated by the CSM 72 are generated in accordance with the ideal waveform shape and the requirement that negative loop gain be maintained during switching. In addition, another consideration is the practical requirement of performing some minimum number of calculations in order to generate the switching waveform. FIGS. 4(a)–4(e) illustrate the preferred shapes of the switching curves, plotted logarithmically, between the various stable states.

It should be noted that the transition into the IDLE state is gradual and requires approximately two seconds. The first 100 msec of the transition represents a delay period in which the values of MX and MR remain substantially unchanged. This delay period is introduced in order to reduce signal modulation between words in that the HADSI 10 tends towards the IDLE state. Transitions from IDLE to active states are similar to the transitions between the XMT and RCV states.

As has been previously stated, the HADSI 10 is preferably implemented with a digital signal processor (DSP) integrated circuit. One suitable device is known as the TMS32020 DSP processor which is manufactured by Texas Instruments. It should be realized however that the concepts embodied in the present invention may be implemented by a number of suitable embodiments, such as by discrete analog circuitry. Thus, the invention is not to be construed to be limited to only the embodiment disclosed above but is instead intended to be limited only as set forth in the claims which follow.

What is claimed is:

1. A speakerphone including a transmit audio path for conveying a transmit signal including speech signals and a receive audio path for conveying a receive signal including speech signals, the speakerphone comprising:
   control means for controlling an operation of said transmit audio path and said receive audio path, said control means having a plurality of input signals and a plurality of output signals, a value of said output signals being a function of a value of said input signals, said output signals including at least a signal expressive of, when asserted, a transmit state, a signal expressive of, when asserted, a receive state and a signal expressive of, when asserted, an idle state,
   said input signals including a first input signal having a value which is a function of:
      a transmit signal power estimate, a transmit audio path noise signal estimate and a transmit audio path echo signal estimate; and
      a receive signal power estimate, a receive audio path noise signal estimate and a receive audio path echo signal estimate.

2. A speakerphone as set forth in claim 1 wherein said input signals further include:
   a second input signal having a value which is a function of the estimate of the power of the transmit signal and the estimate of the noise signal for the transmit audio path, the second signal indicating if the transmit audio path is conveying speech signals; and a third input signal having a value which is a function of the estimate of the power of the receive signal and the estimate of the noise signal for the receive audio path, the third signal indicating if the receive audio path is conveying speech signals.

3. A speakerphone as set forth in claim 2 wherein said input signals further include:

a fourth input signal which is expressive of whether said speakerphone is in a mute condition.

4. A speakerphone as set forth in claim 2 wherein said second input signal is generated by means comprising:

means for multiplying said transmit signal power estimate by a first multiplication factor to obtain a scaled transmit signal power estimate signal;

means for subtracting from said scaled transmit signal power estimate signal said transmit audio path noise signal; and means for subtracting from said transmit signal power estimate signal a first subtracting means signal having a value which is related to a desired transmit signal signal to noise ratio.

5. A speakerphone as set forth in claim 4 wherein said third input signal is generated by means comprising:

means for multiplying said receive signal power estimate by a second multiplication factor to obtain a scaled receive signal power estimate signal;

means for subtracting from said scaled receive signal power estimate signal said receive audio path noise signal; and means for subtracting from said receive signal power estimate signal a second subtracting means signal having a value which is related to a desired receive signal signal to noise ratio.

6. A speakerphone as set forth in claim 5 wherein said first and said second multiplication factor are each equal to approximately 0.75 and wherein said first and said second subtracting means signals each have a value of approximately 0.00305.

7. A speakerphone as set forth in claim 1 wherein said transmit signal power estimate signal and said receive signal power estimate signal are each generated by an envelope detection means having an associated rise time and an associated fall time.

8. A speakerphone as set forth in claim 7 wherein said rise time is approximately one millisecond and wherein said fall time is approximately 28 milliseconds.

9. A speakerphone as set forth in claim 1 wherein said transmit audio path echo estimate signal and said receive audio path echo estimate signal are each generated by an envelope detection means having an associated rise time and an associated fall time.

10. A speakerphone as set forth in claim 9 wherein said rise time is approximately 0.25 millisecond and wherein said fall time is approximately 100 milliseconds.

11. A speakerphone as set forth in claim 1 wherein said control means output signals further comprise a transmit audio path gain defining signal and a receive audio path gain defining signal and wherein said gain defining signals vary the gain of each of said transmit and said receive audio paths within a range of approximately 0 dB to less than approximately −50 dB when either said signal expressive of a transmit state is asserted or said signal expressive of a receive state is asserted.

12. A speakerphone as set forth in claim 11 wherein said gain defining signals define the gain of said transmit audio path to be approximately −10 dB and the gain of said receive audio path to be less than approximately −40 dB when said signal expressive of an idle state is asserted.

13. A speakerphone as set forth in claim 12 wherein said control means comprises means for generating said gain defining signals such that said gain defining signals each have a substantially Gaussian waveshape.

14. A speakerphone including a transmit audio path for conveying, when active, a transmit signal including a speech signal and a receive audio path for conveying, when active, a receive signal including a speech signal, the speakerphone comprising:

first means for generating an estimate of the power of the transmit signal;

second means for generating an estimate of a noise signal component associated with the transmit audio path;

third means for generating an estimate of an echo signal component associated with the transmit audio path;

fourth means for generating an estimate of the power of the receive signal;

fifth means for generating an estimate of a noise signal component associated with the receive audio path;

sixth means for generating an estimate of an echo signal component associated with the receive audio path;

first means for comparing the estimate of the power of the transmit signal to the estimate of the noise signal for the transmit audio path, the first comparing means having an output for indicating if the transmit audio path is conveying speech signals;

second means for comparing the estimate of the power of the receive signal to the estimate of the noise signal for the receive audio path, the second comparing means having an output for indicating if the receive audio path is conveying speech signals;

third means for comparing the estimate of the transmit audio path signal power, noise signal and echo signal with the estimate of the receive audio path signal power, noise signal and echo signal, the third comparing means having an output for indicating whether the transmit audio path or the receive audio path is active; and means, coupled to and responsive to the output of each of the first, the second and the third comparing means, for selecting at least a transmit state, wherein the transmit audio path is active, a receive state, wherein the receive audio path is active, or an idle state, wherein neither the transmit or the receive audio paths are active.

15. A speakerphone as set forth in claim 14 wherein said first generating means, said third generating means, said fourth generating means and said sixth generating means each comprise a signal envelope detection means having a characteristic rise time and a characteristic fall time.

16. A speakerphone as set forth in claim 15 wherein the rise time of said first generating means and said fourth generating means is approximately one millisecond, wherein the fall time of said first generating means and said fourth generating means is approximately 28 milliseconds, wherein the rise time of said third generating means and said sixth generating means is approximately 0.25 millisecond, and wherein the fall time of said third generating means and said sixth generating means is approximately 100 milliseconds.

17. A speakerphone as set forth in claim 14 wherein said state selecting means further comprises means for generating a transmit audio path gain defining signal and means for generating a receive audio path gain defining signal and wherein said gain defining signals vary the gain of each of said transmit and said receive audio paths within a range of approximately 0 dB to less than approximately −50 dB when either of said transmit audio path or said receive audio path are active.

18. A speakerphone as set forth in claim 17 wherein said gain defining signals define, during said idle state, the gain of said transmit audio path to be approximately −10 dB and the gain of said receive audio path to be less than approximately −40 dB.

19. A method of operating a half-duplex speakerphone which includes a transmit audio path for conveying a transmit signal including speech signals and a receive audio path for conveying a receive signal including speech signals, the method comprising the steps of:
(a) generating a transmit signal power estimate, a transmit audio path noise signal estimate and a transmit audio path echo signal estimate; (b) generating a receive signal power estimate, a receive audio path noise signal estimate and a receive audio path echo signal estimate;
(c) comparing the estimate of the power of the transmit signal against the estimate of the noise signal for the transmit audio path for generating a first signal for indicating if the transmit audio path is conveying speech signals;
(d) comparing the estimate of the power of the receive signal against the estimate of the noise signal for the receive audio path for generating a second signal for indicating if the receive audio path is conveying speech signals;
(e) comparing the generated transmit signal power estimate, the transmit audio path noise signal estimate and the transmit audio path echo signal estimate against the generated receive signal power estimate, the receive audio path noise signal estimate and the receive audio path echo signal estimate for generating a third signal for indicating if the speakerphone is in a transmit or a receive state; and
(f) determining a next state of the speakerphone to be a transmit state wherein the transmit audio path is conveying speech signals, a receive state wherein the receive audio path is conveying speech signals, an idle state wherein neither the transmit audio path or the receive audio path is conveying speech signals or a present state, the determined next state being a function at least of the present state of the speakerphone and the values of the first, the second and the third signals.

20. A method as set forth in claim 19 wherein if the next state of the speakerphone is determined to be other than the present state further includes a step of varying a receive audio path gain signal and a transmit audio path gain signal such that a total loop gain of the transmit and the receive audio paths remains less than unity.

21. A method as set forth in claim 20 wherein if the next state of the speakerphone is determined to be transmit and the present state is receive or idle the gain of the transmit audio path is varied until it equals approximately zero dB and the gain of the receive audio path is simultaneously varied until it equals less than approximately −50 dB.

22. A method as set forth in claim 21 wherein if the next state of the speakerphone is determined to be receive and the present state is transmit or idle the gain of the receive audio path is varied until it equals approximately zero dB and the gain of the transmit audio path is simultaneously varied until it equals less than approximately −50 dB.

23. A method as set forth in claim 20 wherein if the next state of the speakerphone is determined to be idle and the present state is transmit or receive the gain of the receive audio path is varied until it equals less than approximately −40 dB and the gain of the transmit audio path is simultaneously varied until it equals approximately −10 dB.

24. A method as set forth in claim 22 wherein the gains of the transmit and receive audio paths are varied over an interval of time equal to approximately 20 milliseconds.

25. A method as set forth in claim 23 wherein the gains of the transmit and receive audio paths are varied over an interval of time equal to approximately 2 seconds.

* * * * *

UNITED STATES PATENT AND TRADEMARK OFFICE
CERTIFICATE OF CORRECTION

PATENT NO. : 4,879,745

DATED : November 7, 1989

INVENTOR(S) : Ygal Arbel

It is certified that error appears in the above-identified patent and that said Letters Patent is hereby corrected as shown below:

The Appl. No. should read "256,610".

Signed and Sealed this

Eleventh Day of September, 1990

Attest:

HARRY F. MANBECK, JR.

*Attesting Officer*      *Commissioner of Patents and Trademarks*